Nov. 15, 1949  W. J. MILLER  2,488,023
SADDLE CAP TYPE TRUCK HITCH
Filed June 4, 1947
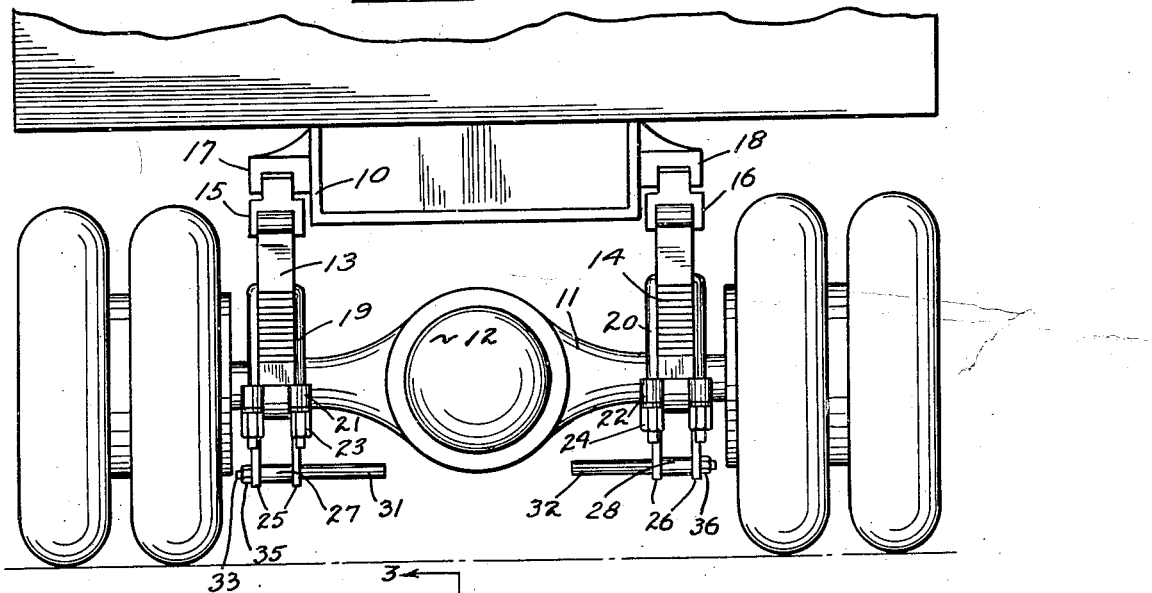
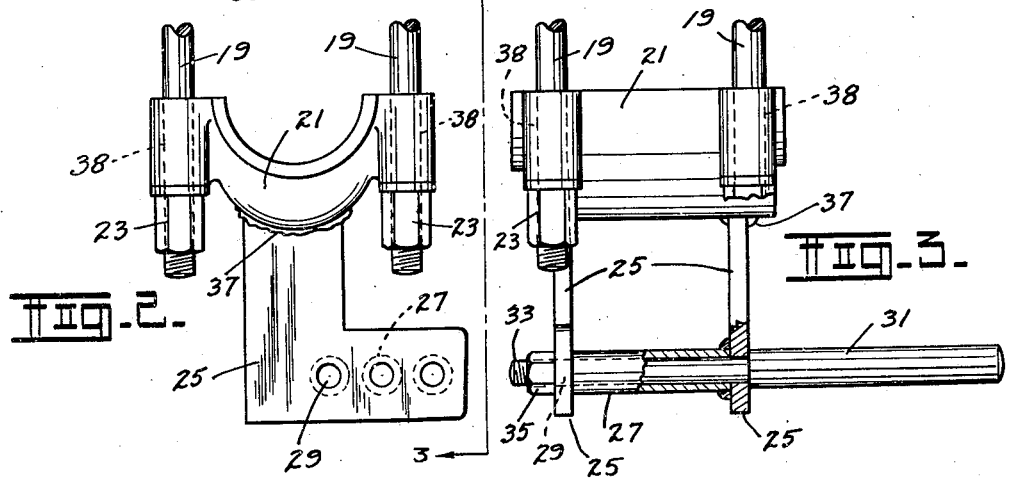
INVENTOR.
William J. Miller
BY
W. B. Harpman
ATTORNEY.

Patented Nov. 15, 1949

2,488,023

UNITED STATES PATENT OFFICE 2,488,023

SADDLE CAP TYPE TRUCK HITCH

William J. Miller, Youngstown, Ohio

Application June 4, 1947, Serial No. 752,416

3 Claims. (Cl. 280—33.44)

This invention relates to hitches and more particularly to a hitch for application to the rear axle of a truck.

The principal object of the invention is the provision of a hitch for application to the rear axle of a truck and attachable thereto in place of a conventional saddle cap thereon.

A further object of the invention is the provision of a hitch for application to the rear axle of a truck having a projecting hitching member providing means for conveniently attaching spreader boxes and the like thereto.

A still further object of the invention is the provision of a hitch for application to the rear axle of a truck and including an adjustably positioned hitch member.

The saddle cap type of hitch disclosed herein is of particular advantage in connection with the attachment of material spreading boxes and the like to trucks such as, for example, the spreader box as disclosed in my Patent No. 2,403,820, issued July 9, 1946, wherein a convenient and practical hitch to a truck is necessary for the operation of the spreader box. It has been proposed in the past to weld or otherwise affix various transversely positioned bar-like members to a truck axle usually beneath or behind the same to provide for the attachment of spreader boxes and the like thereto. This practice is objectionable in that it is necessary to weld or otherwise alter the component parts of the truck such as the rear axle which is undesirable and often impractical.

The present invention relates to a hitch which may be applied to a truck and particularly the rear axle construction thereof by substituting it for a conventional saddle cap commonly found in rear axle and spring assemblies as an integral part of the means holding the spring assemblies in position on the rear axle. The present invention, therefore, provides a convenient and practical hitch which may be easily installed on a truck without altering the component parts of the truck as by welding or otherwise affixing hitching members thereto.

The saddle cap type of hitch shown and described herein can be fabricated partly from replacement saddle caps for truck equipment thereby making possible an inexpensive construction which is certain of fitting the particular saddle cap location to which it is applied.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a rear view of a truck with parts broken away showing the application of the saddle cap type of hitch thereto.

Figure 2 is a side view of the saddle cap type hitch.

Figure 3 is a front view of the saddle cap type hitch with parts broken away and parts in cross section.

By referring to the drawings and Figure 1 in particular it will be seen that a truck has been disclosed and includes the usual main frame 10 and an axle 11 having a differential case 12 therein and spaced with respect to the frame 10 by a pair of spaced semielliptical springs 13 and 14 which are affixed at their upper and outermost ends to the frame 10 by means of shackles 15 and 16 and shackle brackets 17 and 18. The springs 13 and 14 are held in appropriate position on suitable surfaces of the rear axle 11 by means of inverted U-shaped spring bolts 19 and 20 with the uppermost portions thereof passing over the springs 13 and 14, respectively, and the lowermost ends thereof being threaded and passed through openings in saddle cap hitches 21 and 22, respectively, positioned beneath the axle 11.

A plurality of bolts 23 and 24 threadably engage the spring bolts 19 and 20, respectively, so as to hold the saddle cap hitches 21 and 22. It will thus be seen that each of the rear springs 13 and 14 of the truck, and more particularly their means of attachment with the axle 11, form the means of attachment of the saddle cap type hitches 21 and 22 to the truck axle.

It will be obvious to those skilled in the art that the saddle cap type hitches 21 and 22 replace conventional saddle caps customarily employed in truck constructions and that, therefore, the substitution of the saddle cap type hitches 21 and 22 for the conventional saddle caps is a simple operation which may be readily performed. Each of the saddle cap hitches 21 and 22 includes a pair of downwardly depending L-shaped brackets 25 and 26, respectively, which brackets are spaced apart adjacent their lowermost ends by means of one or more tubular spacing members 27 and 28, respectively, and registering with oppositely disposed pairs of openings 29 and 30, respectively. Each of the saddle cap hitches 21 and 22 is provided with a hitch pin 31 and 32, respectively, of a length approximately three times that of the width of the spaced brackets 25 or 26. Each of the hitch pins 31 and 32 has an area of lesser diameter for insertion into the openings 29 or 30 of the L-shaped brackets 25 or 26, which area of lesser diameter terminates in a threaded section 33 and 34, respectively, so that nuts 35 and 36, respectively, may be threadably engaged thereon so as to hold the pins 31 and 32, respectively, in assembled relation to the brackets 25 and 26, respectively.

In Figures 2 and 3 of the drawings enlarged side and front elevations of the said cap type hitches are disclosed and for the sake of clarity in this disclosure the saddle cap type hitch 21 is disclosed and shown in connection with the lowermost portions of the spring mounting bolts 19 and attached thereto by the bolts 23. It will be observed that the spaced, L-shaped brackets 25 are shown as being welded to the saddle cap portions of the hitch, the welds being indicated by the numeral 37 and the saddle cap portion of the hitches shown with vertically positioned openings 38 through which the spring bolts 19 pass.

By again referring to Figure 1 of the drawings it will be seen that the hitch pins 31 and 32 are positioned in the spaced, L-shaped bracket portions 25 and 26 of the saddle cap hitches 21 and 22 in oppositely disposed relation so as to extend inwardly or toward the differential case 12 of the rear axle thereby enabling a spreader box or the like to be attached directly to the hitch pins 31 and 32. It will be seen that the provision of the plurality of oppositely disposed pairs of openings 29 and 30 in the lowermost portions of the hitches 21 and 22, respectively, enable the hitch pins 31 and 32 to be positioned in several different locations—either beneath, in front of, or in back of the axle 11 so as to provide means compensating for the variations and length of the truck body or bed with respect to a device attached to the hitches. For example, when a spreader box is attached thereto, variations in the truck body length will determine the positioning of the hitch pins 31 and 32 to the end that the spreader box is mounted in the most desirable position with respect to the truck so as to effectively receive materials to be spread therefrom.

It will also be seen that the saddle cap type hitches disclosed herein may be formed as integral units as by casting, forging and the like with the exception of the hitch pins 31 and 32, or they may be fabricated by welding pairs of spaced, L-shaped brackets to regulation replacement saddle caps in which event the saddle caps removed from a truck may be affixed to the L-shaped brackets by the welding operation and the assembled device replaced on the truck to form the completed saddle cap type hitch. Either method of formation is satisfactory and insures the desired accuracy of fit between the saddle cap portions of the saddle cap type hitches and the axle constructions with which they are used.

It will be observed that the saddle cap type hitches disclosed herein provide direct connection with the axle of the truck for any device attached to the said hitches thereby securing a safe and strong hitch.

It will thus be seen that the several objects of the invention are met by the saddle cap type hitches disclosed herein.

Having thus described my invention, what I claim is:

1. A combination saddle cap and hitch device attachable to an axle and spring assembly of the said truck by means of U-shaped bolt and nut assemblies to secure said axle to said spring assemblies, said saddle cap and hitch device comprising a bracket fitting underneath said axle and having a pair of spaced members depending therefrom, said pair of members having a plurality of transversely positioned openings formed therein and a hitch pin removably positioned in the said openings and extending parallel with respect to the said axle.

2. A combination saddle cap and hitch device for truck rear axle and spring assemblies, said saddle cap and hitch device comprising an arcuate flanged bracket engageable beneath the said axle, and fasteners positioned over said axle and spring assemblies and secured to the said arcuate flanged bracket to hold the said spring assemblies together on the said axle, an L-shaped depending member on the said arcuate flanged bracket and positioned parallel to the said spring assemblies and having openings transversely thereof and a hitch pin removably secured in the said openings and parallel with the said axle.

3. A combination saddle cap and truck hitch comprising an arcuate flanged bracket engageable beneath a truck rear axle and spring assembly, U-bolts positioned over the said axle and spring assembly and secured to the said bracket so as to hold the said spring assembly in position on the said axle, a pair of spaced depending members formed on the said bracket, tubular spacing members secured between said depending members and transversely aligned openings in said members registering with said tubular spacing members, a hitch pin positioned through the said openings and one of the said tubular members and at right angles to the said depending body member.

WILLIAM J. MILLER.

REFERENCES CITED

The following references are of record in the file of this patent:

UNITED STATES PATENTS

| Number | Name | Date |
|---|---|---|
| 1,604,623 | Whidden | Oct. 26, 1926 |
| 2,397,001 | Goodwin | Mar. 19, 1946 |